July 25, 1944.  C. E. ASHTON  2,354,356

PICKING DEVICE

Filed July 27, 1943

INVENTOR
Chas. E. Ashton
BY
ATTYS

Patented July 25, 1944

2,354,356

UNITED STATES PATENT OFFICE 2,354,356

PICKING DEVICE

Charles Edwin Ashton, Stockton, Calif.

Application July 27, 1943, Serial No. 496,295

9 Claims. (Cl. 56—32)

This invention relates in general to an improved picking device, and in particular the invention is directed to, and it is one of the objects to provide, a novel picking device which includes driven picking mechanism, operated by a suction actuated impeller.

While especially adapted for picking cotton from the bushes, the device is readily adaptable to many other uses, as will be apparent.

Another object of the invention is to provide a suction operated picking device which includes a housing having air entry ports in one end thereof, a suction actuated impeller mounted in the housing adjacent said ports in the path of air entry therethrough, means to connect said housing with a source of suction at a point in the housing spaced from said impeller and on the side of the latter opposite said air entry ports, one side of the housing including an intake mouth for the material to be picked, and picking mechanism mounted in the housing in cooperating relation to said mouth, said mechanism being driven by the impeller upon suction of air through the latter.

A further object of the invention is to provide a picking device as above in which said one end of the housing comprises a removable cover; the impeller being journaled axially on and supported by said cover whereby the impeller is removable with the cover, there being an axially alined drive gear associated with the impeller and normally meshing in axially separable relation with a pinion included in the picking mechanism.

It is also an object of this invention to provide a picking device of the type described in which the picking mechanism comprises a pair of adjacent parallel picking rolls driven to turn toward each other on the side adjacent the material intake mouth, and including longitudinal, circumferentially spaced spiral lips; said rolls being geared together to rotate in the same relation, and the lips being oppositely spiraled and disposed so that corresponding lips progressively substantially engage from one end to the other upon rotation of the rolls.

A further object of the invention is to provide a simple and inexpensive device, and yet one which will be exceedingly effective for the purpose for which it is designed.

These objects I accomplish by means of such structure and relative arrangement of parts as will fully appear by a perusal of the following specification and claims.

In the drawing similar characters of reference indicate corresponding parts in the several views.

Figure 1:
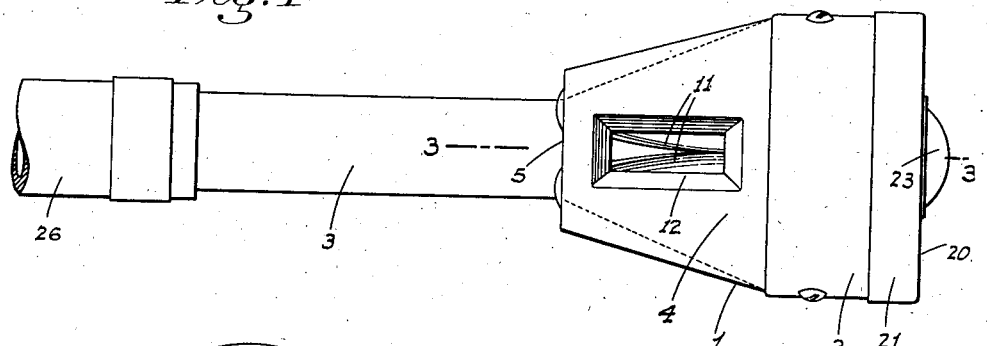
Figure 1 is an elevation of the device.
Figure 2:
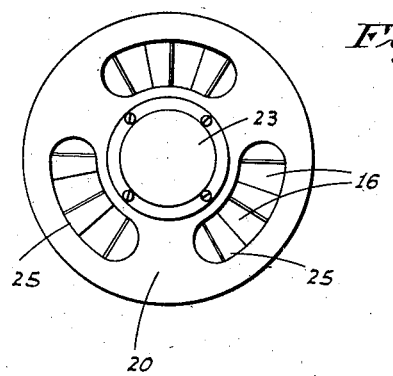
Figure 2 is a front end view of the device.
Figure 3:
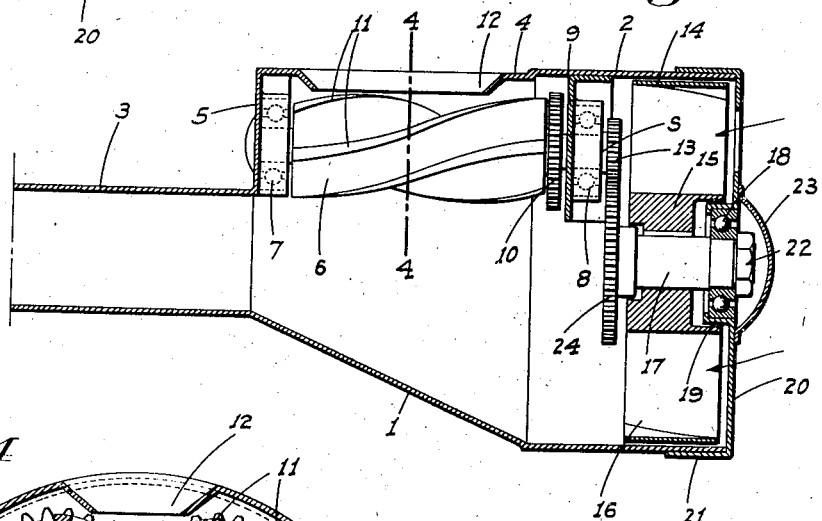
Figure 3 is an enlarged sectional elevation on line 3—3 of Fig. 1.
Figure 4:
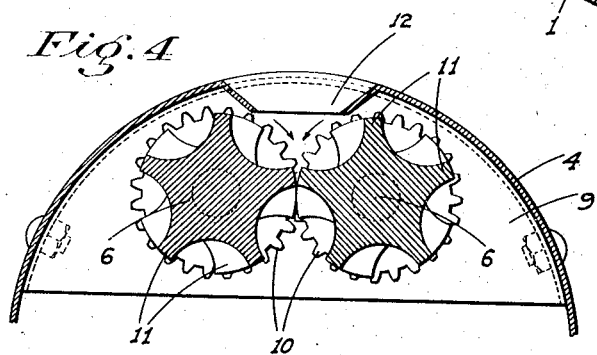
Figure 4 is an enlarged cross section on line 4—4 of Fig. 3.

Referring now more particularly to the characters of reference on the drawing, my improved picking device comprises a housing, indicated generally at 1; the forward end portion 2 of said housing being cylindrical and initially open at the front end, while the rear end portion of the housing is generally funnel-shaped, and leads to connection with a rigid, handle forming suction tube 3. One side 4 of the rear portion of the housing is enlarged and of substantially semi-circular configuration in cross section, as shown in Fig. 4, matching at its front end with the cylindrical portion 2 of the body, and formed at its rear end with a right angle end wall 5 disposed in offset relation to the suction tube 3.

The side 4 of the rear portion of the housing, formed as above, provides the enclosure for a picking mechanism which comprises a pair of parallel picking rolls 6 disposed in adjacent cooperative relation and extending axially of the housing and tube 3. These rolls are journaled at one end in bearings 7 mounted on the end wall 5, and journaled at the other end in bearings 8 mounted on a cross wall 9 in the housing.

The picking rolls are geared together at their forward ends by pinions 10, and said rolls include longitudinally extending, circumferentially spaced spiral lips 11, said lips being oppositely spiraled and disposed so that corresponding ones of said lips always progressively engage from one end to the other upon simultaneous rotation of the rolls in a direction to turn toward each other on the side adjacent a longitudinally extending intake mouth 12 formed in the enlarged side 4 of the housing closely adjacent the outside of the rolls.

The picking roll mechanism as above described is driven as follows:

One of the picking rolls 6 has an extended shaft S on which is mounted a pinion 13 disposed ahead of the corresponding bearing 8. A circular suction actuated impeller 14 is disposed in the cylindrical forward end portion 2 of the housing and includes a hub 15 and a plurality of circumferentially spaced, angularly disposed impeller vanes 16. The hub 15 is keyed on a spindle 17 journaled at its forward end in a bearing 18 mounted in a cage 19; said cage being formed in connection with a removable cover 20 which normally encloses the initially open front end of the housing; said cover including an annular retaining flange 21 which engages about the cylindrical portion 2 of said housing. A nut 22 retains the spindle 17 in bearing 18, and the cover 20 includes a centrally disposed removable cap 23 which encloses the front end of the spindle and bearing assembly.

At its rear end the spindle 17 is fitted with a gear 24 which meshes in axially separable relation with pinion 13, whereby the assembly of cover 20, impeller 14 and gear 24 may be withdrawn for cleaning and maintenance of the device.

The cover 20 is formed with a plurality of circumferentially spaced ports 25, with which the impeller vanes 16 register.

In the use of the device the suction tube 3 is connected at its rear end with a flexible conduit 26 which leads to a source of suction (not shown). On a cotton harvester such source of suction comprises a large suction fan or blower which delivers into a cotton catch bin.

Upon creation of suction in housing 1 a forceful air stream is drawn through the ports 25 across the impeller vanes 16; the reaction of said stream on said vanes rotating the impeller, which in turn drives the picking roll mechanism through the medium of gear 24 and pinion 13. The vanes 16 are set so that rotation of impeller 14 is in a direction to cause the rolls to turn toward each other on the side adjacent the intake mouth 12.

With the picking device functioning as above described, the operator grasps the handle-forming tube 3 and manipulates the device so that the material to be picked projects into the intake mouth 12, whereupon the picking rolls 6 grasp such material, pull it through the mouth and discharge it into the housing 1 adjacent the forward end of the tube 3. As so discharged into the housing the material is sucked through tube 3 and flexible conduit 26 for discharge at a selected point.

My improved picking device, as above described, is relatively light weight, and is so constructed that the operator can effectively and readily manipulate the device to varyingly position the same for picking operations.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. A picking device comprising a housing adapted for connection with a suction conduit, said housing having an air intake port and a spaced material intake mouth therein, a driven picking device mounted in the housing adjacent and in cooperative relation to said mouth, a suction actuated impeller rotatably mounted in the housing in the path of air drawn through said port, and drive means between the impeller and picking mechanism; said picking mechanism comprising a pair of cooperating picking rolls rotatably mounted in adjacent parallel relation, the rolls being driven to turn toward each other on the side adjacent said mouth, and said mouth being of a width less than the distance between the roll axes and of a length slightly less than said rolls.

2. A picking device comprising a housing adapted for connection with a suction conduit, said housing having an air intake port and a spaced material intake mouth therein, a driven picking device mounted in the housing adjacent and in cooperative relation to said mouth, a suction actuated impeller rotatably mounted in the housing in the path of air drawn through said port, and drive means between the impeller and picking mechanism; said picking mechanism comprising a pair of cooperating picking rolls rotatably mounted in adjacent parallel relation, the rolls being driven to turn toward each other on the side adjacent said mouth and each roll including a plurality of longitudinally extending, circumferentially spaced spiral lips thereon.

3. A picking device as in claim 2 in which said picking rolls are geared together for driving simultaneously in the same relation to each other; said lips being oppositely spiraled and corresponding lips being disposed to progressively run together from one end to the other thereof upon rotation of said rolls.

4. A picking device comprising a housing adapted at one end for connection with a suction conduit, said housing having an air intake port in the opposite end and a material intake port in one side, a suction actuated impeller journaled in the housing adjacent said intake port, a driven picking mechanism mounted in the housing adjacent said mouth, and drive connections between the impeller and picking mechanism.

5. A picking device comprising a housing adapted at one end for connection with a suction conduit, said housing having an air intake port in the opposite end and a material intake port in one side, a suction actuated impeller journaled in the housing adjacent said intake port, a driven picking mechanism mounted in the housing adjacent said mouth, and drive connections between the impeller and picking mechanism; said picking mechanism comprising a pair of adjacent parallel picking rolls, meshing pinions fixed in connection with one end of said rolls, and another pinion fixed with one of said rolls, said drive connections including a gear driven by the impeller and meshing with said other pinion.

6. A picking device as in claim 5 in which the housing includes a removable cover at said opposite end; the impeller and said gear being removable with said cover as a unit and separate from the picking mechanism.

7. A picking device comprising a housing adapted at one end for connection with a suction conduit, said housing having an air intake port in the opposite end and a material intake port in one side, a suction actuated impeller journaled in the housing, the impeller being disposed adjacent said air intake port and with the impeller axis extending lengthwise of the device, a driven picking mechanism mounted in the housing adjacent said mouth and including a pinion whose axis is parallel to the impeller axis but spaced laterally therefrom, and an impeller shaft having a gear thereon in mesh with the pinion, said gear being axially separable from the pinion and the housing including a removable cover at said opposite end and with which cover the impeller, shaft, and gear are removable as a unit.

8. A picking device comprising a housing adapted at one end for connection with a suction conduit, said housing being circular at its forward end and including a cover normally but removably enclosing said end, said cover having air intake openings therein, a circular impeller assembly disposed in and journaled on said cover in axial alinement, said assembly including a drive gear at its inner end, the housing having an intake mouth in one side rearwardly of the impeller assembly, and a driven picking mechanism mounted in the body adjacent said mouth and including a pinion in mesh with but axially separable from said gear.

9. A picking device comprising a housing having a rigid, handle-forming suction tube projecting from one end thereof, there being an air intake port in the opposite end and a material intake mouth in one side of the housing, a driven picking mechanism mounted in the housing in cooperative relation to said mouth, a suction actuated impeller assembly mounted in the housing adjacent said port, and drive connections between said assembly and mechanism; the housing being generally funnel-shaped on the side opposite the picking mechanism and between the impeller assembly and suction tube.

CHARLES EDWIN ASHTON.